US008485051B2

(12) United States Patent
Knoop et al.

(10) Patent No.: US 8,485,051 B2
(45) Date of Patent: Jul. 16, 2013

(54) APPARATUS AND METHOD FOR TESTING AN AIRCRAFT PEDAL SYSTEM

(75) Inventors: Sven Knoop, Hamburg (DE); Mike Galinski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 311 days.

(21) Appl. No.: 12/744,943

(22) PCT Filed: Nov. 29, 2007

(86) PCT No.: PCT/EP2007/010378
§ 371 (c)(1),
(2), (4) Date: Oct. 19, 2010

(87) PCT Pub. No.: WO2009/068064
PCT Pub. Date: Jun. 4, 2009

(65) Prior Publication Data
US 2011/0203391 A1      Aug. 25, 2011

(51) Int. Cl.
*G01L 5/00* (2006.01)
*G01L 1/22* (2006.01)
*G01L 5/04* (2006.01)
*B64C 19/02* (2006.01)
*G05D 1/00* (2006.01)

(52) U.S. Cl.
USPC .............. 73/862.381; 73/862.474; 73/862.46; 244/235; 701/11; 701/48

(58) Field of Classification Search
USPC ......... 73/862.381, 862.46, 862.474; 244/235; 701/11, 48
See application file for complete search history.

(56) References Cited

U.S. PATENT DOCUMENTS 3,576,302 A  *  4/1971  Palfreyman ................... 244/236
4,094,479 A  *  6/1978  Kennedy, Jr. .................. 244/179
(Continued)

FOREIGN PATENT DOCUMENTS

| CN | 1415940 A | 5/2003 |
|---|---|---|
| GB | 2 192 681 | 1/1986 |

(Continued)

OTHER PUBLICATIONS

International Search Report for Appln. No. PCT/EP2007/010378 dated Jul. 15, 2008.
Notification of Reason for Refusal issued in corresponding Japanese Patent Application No. 2010-535229 on Jul. 10, 2012.

*Primary Examiner* — Lisa Caputo
*Assistant Examiner* — Jonathan Dunlap
(74) *Attorney, Agent, or Firm* — Carter, DeLuca, Farrell & Schmidt, LLP

(57) ABSTRACT

An apparatus (10) for testing an aircraft pedal system (12) comprises a pedal actuation device (14) for actuating an aircraft pedal (12', 12"), a force sensor (26) for sensing an actuation force applied to the aircraft pedal (12', 12") upon actuation of the aircraft pedal (12', 12") and for providing a signal indicative of the actuation force, a deflection sensing device (28, 30) for sensing an angular deflection of a device (12', 12"; 13) deflected in response to the actuation of the aircraft pedal (12', 12"), and a control unit (32) adapted to process the signals of the force sensor (26) and the deflection sensing device (28, 30) so as to generate an output indicating the angular deflection of the device (12', 12"; 13) deflected in response to the actuation of the aircraft pedal (12', 12") in dependence on the actuation force applied to the aircraft pedal (12', 12").

18 Claims, 1 Drawing Sheet

U.S. PATENT DOCUMENTS

| | | | |
|---|---|---|---|
| 4,759,515 A | * 7/1988 | Carl | 244/76 R |
| 4,771,387 A | 9/1988 | Hexel et al. | |
| 5,023,791 A | 6/1991 | Herzberg et al. | |
| 5,060,889 A | * 10/1991 | Nadkarni et al. | 244/183 |
| 5,077,671 A | * 12/1991 | Leslie et al. | 701/3 |
| 5,483,825 A | 1/1996 | Greenbaum | |

FOREIGN PATENT DOCUMENTS

| | | |
|---|---|---|
| JP | 07-108997 A | 4/1995 |
| RU | 2281865 C2 | 8/2006 |

\* cited by examiner

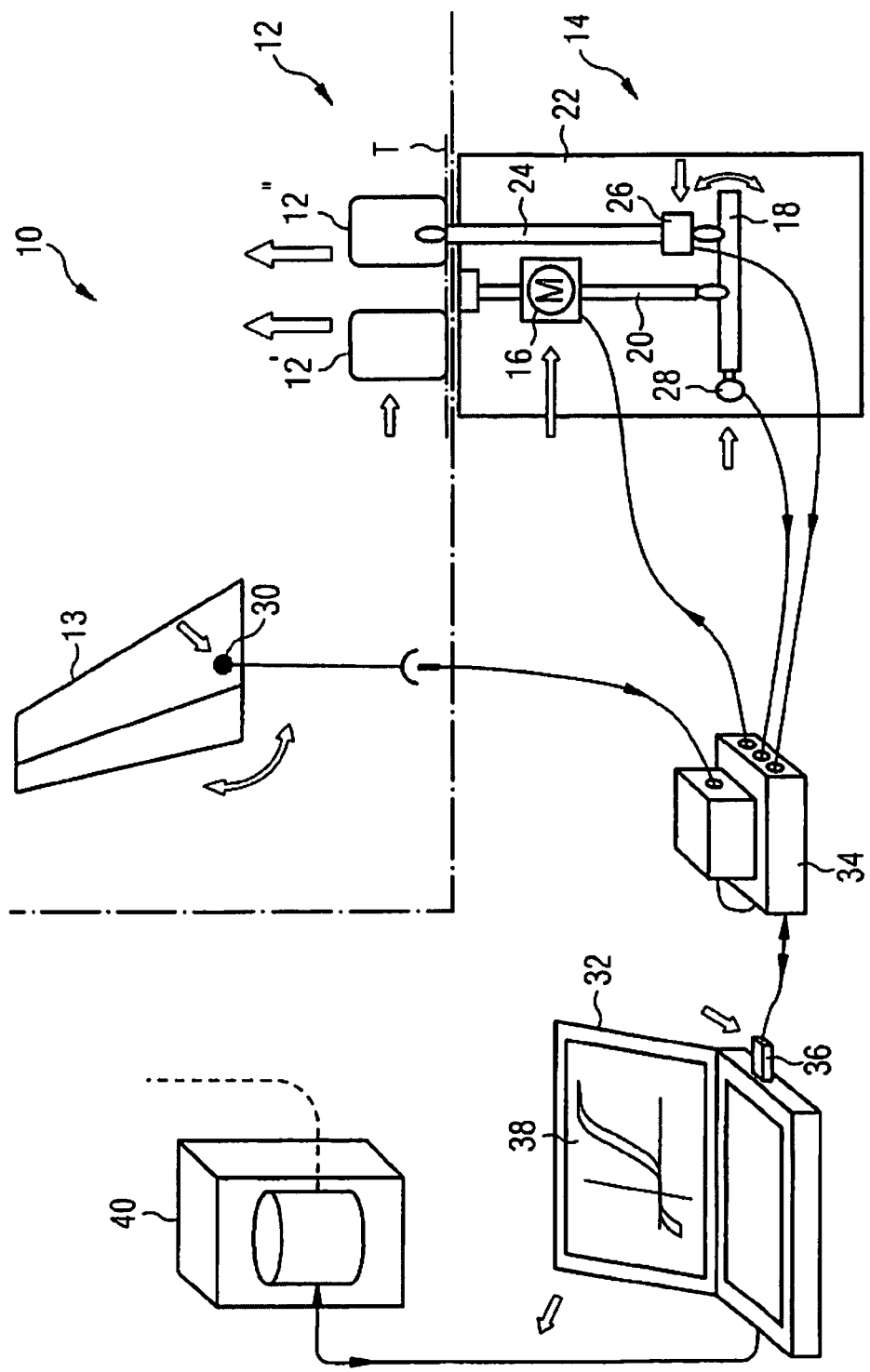

APPARATUS AND METHOD FOR TESTING AN AIRCRAFT PEDAL SYSTEM

The invention is directed to an apparatus and a method for testing an aircraft pedal system.

The brakes and the rudder of an aircraft, in particular a passenger plane, typically are actuatable by means of pedals disposed in the aircraft cockpit. Usually, two identical pairs of pedals for actuating the aircraft brakes and the aircraft rudder are provided, one for the Captain and one for the First Officer of the aircraft. A right pedal of each pedal pair serves to actuate a right aircraft brake and to induce a movement of the aircraft rudder to the right. A left pedal of each pedal pair serves to actuate a left aircraft brake and to induce a movement of the aircraft rudder to the left. To actuate the aircraft brakes, the pedals can be tilted around a tilting axis, whereas an actuation of the aircraft rudder can be achieved by pushing the pedals forwards, i.e. in a direction towards a front end of the aircraft.

In some aircraft types, in particular single aisle aircraft types, an aircraft brake system is a brake-by-wire system. The brake-by-wire system might comprise an electronic control unit which receives signals from pedal sensors indicating e.g. an actuation force applied to a pedal and/or a pedal actuation velocity. The electronic control unit then, on the basis of the signals provided by the pedal sensors, generates actuation signals which are transmitted to a brake actuation device so as to actuate the aircraft brakes as requested by the actuation of the pedal. An aircraft rudder system might be a flight-by-wire system, but alternatively also might be a mechanical system comprising cables which upon actuation of a rudder pedal mechanically transmit the pedal actuation force to the rudder so as to induce a pivoting movement of the rudder.

During final assembly of an aircraft, the proper operation of an aircraft brake and rudder pedal system has to be tested. In particular, a test has to be performed on the aircraft brake and rudder pedal system so as to discover defects of individual components or defects in assembling which could impede a proper actuation of the aircraft brake and rudder pedal system.

The present invention is directed to the problem to provide an apparatus and a method for testing an aircraft pedal system which allows to reliably and time-savingly test the proper operation of the aircraft pedal system.

To solve the above problem, an inventive apparatus for testing an aircraft pedal system comprises a pedal actuation device. The pedal actuation device preferably is a mechanical device which serves to mechanically actuate an aircraft pedal. The inventive apparatus further comprises a force sensor for sensing an actuation force applied to the aircraft pedal upon actuation of the aircraft pedal by means of the pedal actuation device. The force sensor further is adapted to provide a signal indicative of the actuation force measured by the sensor. A deflection sensing device of the inventive apparatus for testing an aircraft pedal system serves to sense an angular deflection of a device deflected in response to the actuation of the aircraft pedal. Finally, a control unit is provided which is adapted to process the signals of the force sensor and the deflection sensing device so as to generate an output indicating the angular deflection of the device deflected in response to the actuation of the aircraft pedal in dependence on the actuation force applied to the aircraft pedal. The control unit might e.g. be a stationary personal computer or a laptop computer.

As explained in detail above, a brake system and a rudder of an aircraft can be actuated by means of the same pair of pedals provided in the cockpit of the aircraft. To actuate an aircraft brake, a pedal is tilted around a tilting axis, whereas an actuation of the aircraft rudder is achieved by pushing the pedal forwards, i.e. in a direction towards a front end of the aircraft. By appropriately selecting a force application point on the pedal, the inventive apparatus thus can be used for testing either an aircraft brake actuation or an aircraft rudder actuation. In dependence on whether the apparatus is used for testing a brake actuation or a rudder actuation, the deflection sensing device senses either the deflection of a component of the aircraft brake system or the deflection of a component of the aircraft rudder system.

The output of the control unit which indicates the angular deflection of the device deflected in response to the actuation of the aircraft pedal in dependence on the actuation force applied to the aircraft pedal might be provided in the form of a data table and/or in the form of a diagram showing a plot of the angular deflection of the device deflected in response to the actuation of the aircraft pedal in dependence on the actuation force applied to the aircraft pedal. The table and/or the diagram might be displayed on a display unit of the control unit and/or printed by means of a printer connected to and controlled by the control unit. The data acquired by the control unit during performing a test might be stored in a memory which might either be an integral component of the control unit or a separate memory unit. The inventive apparatus for testing an aircraft pedal system allows to reliably and time-savingly test the proper operation of the aircraft pedal system and to display the test results to a user via the control unit. The control unit thus forms the man-machine-interface of the inventive test apparatus.

The control unit of the inventive apparatus for testing an aircraft pedal system might further also be adapted to control the pedal actuation device. In particular, the pedal actuation device might be controlled by the control unit by means of an appropriate computer program running in the control unit which causes the control unit to output respective control signals to the pedal actuation device. The control signals provided to the pedal actuation device by the control unit might be selected in accordance to predefined test requirements defining various test parameters, e.g. a nominal pedal actuation force, a pedal actuation velocity, etc.

The inventive apparatus for testing an aircraft pedal system might also be embedded in a higher order test environment. The higher order test environment might be adapted to simulate specific situations, e.g. flight situations, while the aircraft to be tested in fact is on the ground. The inventive apparatus then e.g. could be used to test the behaviour of the aircraft brake system and/or the aircraft rudder system upon actuation of the brake pedal and the rudder pedal, respectively, in the specific situation simulated by the test environment.

Preferably, the pedal actuation device of the inventive apparatus comprises an electric motor, e.g. a linear electric DC motor, for driving a force transmitting lever which is tiltably attached to a base structure of the pedal actuation device. The electric motor might be connected to the force transmitting lever via a worm gear. The base structure preferably is adapted to be fixed to a structural component of the aircraft. The force transmitting lever might be connected to a force application rod for applying the actuation force to the aircraft pedal.

For performing an aircraft brake pedal or an aircraft rudder pedal test the base structure of the pedal actuation device might be fastened to a structural component of the aircraft, preferably a floor panel disposed in the aircraft cockpit. Thereafter, the force application rod might be attached to an aircraft pedal by means of a suitable clamping device. The force application point on the pedal, i.e. the attachment point of the force application rod to the pedal might be selected in dependence on whether the aircraft brake system or the aircraft rudder system should be tested. If the aircraft brake system should be tested, the force application point on the pedal should be selected so as to ensure that an operation of the pedal actuation device causes a tilting of the pedal. To the contrary, if the aircraft rudder system should be tested, the force application point on the pedal should be selected so as to ensure that an operation of the pedal actuation device causes a translatory movement of the pedal in the direction of a front end of the aircraft.

To actuate the aircraft pedal, the electric motor of the pedal actuation device might to be operated so as to shorten a length of the worm gear and thus cause a tilting movement of the force transmitting lever in a forward direction, i.e. in a direction towards the aircraft pedal. Due to the tilting movement of the force transmitting lever the driving force of the electric motor is transmitted to the force application rod and hence the aircraft pedal. The operation of the electric motor might be controlled by means of the control unit in accordance with predefined test parameters forming the basis of a computer program running in the control unit.

Preferably, the force sensor for sensing the actuation force applied to the aircraft pedal upon actuation of the aircraft pedal is connected to the force application rod. Since the force application rod is the device which directly applies the actuation force provided by the electric motor of the pedal actuation device to the aircraft pedal, positioning the sensor on the force application rod allows a particular reliable and exact measuring of the force applied to the aircraft pedal.

As already mentioned above, the inventive apparatus might be used for testing either an aircraft brake actuation or an aircraft rudder actuation. If the apparatus is used for testing an aircraft brake actuation, the deflection sensing device preferably is a device for sensing the angular deflection, i.e. the tilting of the aircraft pedal in response to the actuation of the aircraft pedal. Since the aircraft brake system typically is a brake-by-wire system, the deflection of the aircraft pedal in response to the actuation of the aircraft pedal is an important parameter for the proper operation of the brake system.

The pedal deflection sensing device might be a potentiometer which might be directly attached to the aircraft pedal. Preferably, the pedal deflection sensing device, however, is mounted to the tiltable force transmitting lever of the pedal actuation device. In other words, the pedal deflection sensing device preferably senses the deflection or tilting angle of the force transmitting lever which directly corresponds to the angular deflection of the aircraft pedal. By using a pedal deflection sensing device forming an integral component of the of the pedal actuation device the installation of a pedal deflection sensing device on the aircraft pedal for test purposes can be omitted. Thus, the installation of the inventive test apparatus in the aircraft is significantly simplified.

If the inventive apparatus is used for testing an aircraft rudder actuation, the deflection sensing device preferably is a device for sensing the angular deflection of the aircraft rudder in response to the actuation of the aircraft pedal. Since the aircraft rudder system typically is a mechanical cable system, the actual rudder deflection in response to the actuation of the aircraft pedal is an important parameter for the proper operation of the rudder system. The rudder deflection sensing device might be a potentiometer which might be directly attached to the aircraft rudder. Preferably, a rudder deflection sensor which forms a component of the aircraft rudder system is used as a deflection sensing device by simply connecting the rudder deflection sensor to the control unit of the inventive apparatus.

In a preferred embodiment the inventive apparatus for testing an aircraft pedal system further comprises a signal amplification device. The signal amplification device might be connected between the control unit and the force sensor so as to amplify the signals exchanged between the control unit and the force sensor. Preferably, the signal amplification device does not amplify the signals exchanged between the control unit and the deflection sensing devices. It is, however, also possible to modify the signal amplification device so as to be adapted to also amplify the signals exchanged between the control unit and the deflection sensing devices.

The inventive apparatus also might comprise a power supply adjusting device which is adapted to adjust the power supply to various components of the apparatus, in particular components of the pedal actuation device. For example, the power supply adjusting device might be adapted to adjust the power supply to the electric motor, the force sensor and the potentiometer for sensing the angular deflection of the aircraft pedal upon applying an actuation force to the aircraft pedal.

Preferably, the inventive apparatus comprises a single interface component which serves to amplify signals exchanged between the control unit and the pedal actuation device and to adjust the power supply to various components of the apparatus, in particular components of the pedal actuation device. The signal levels of the inventive apparatus for testing an aircraft pedal system are relatively low. The apparatus thus has a low susceptibility to electromagnetic disturbances.

The inventive apparatus further might comprise an analogue-digital converter for converting signals exchanged between the control unit and the signal amplification and power supply adjusting interface component.

The control unit of the inventive apparatus for testing an aircraft pedal system might be connected to a data base server. The connection between the control unit and the data base server might be achieved by means of a Local Area Network (LAN). Test data then can easily be stored in a memory of the data base server which reduces the risk that data is lost in case of a failure of a memory of the control unit.

The control unit might further be adapted to compare an angular deflection value sensed by means of the deflection sensing device at a predetermined actuation force with a nominal angular deflection value at the predetermined actuation force. Preferably, two different angular deflection values measured at two different predetermined actuation force values might be compared with two different nominal angular deflection values at these two different predetermined actuation force values. The nominal angular deflection values might e.g. be stored in a memory of the control unit or the data base server. Furthermore, the control unit might be adapted to output a warning signal, if a difference between the angular deflection value sensed by means of the deflection sensing device and the nominal angular deflection value at the predetermined actuation force exceeds a predetermined limit. The warning signal can be output in the form of coloured messages on a display unit of the control unit. It is, however, also possible to output an acoustic warning signal, either by means of the control unit or by means of a separate warning signal output device.

In particular, the control unit might be adapted to compare a sensed minimal and/or maximal angular deflection value and/or a sensed minimal and/or maximal actuation force and/or a sensed friction value and/or a sensed symmetry value with respective nominal values. A warning signal might be output, if a difference between a sensed value and a nominal value exceeds a predetermined limit.

An inventive method for testing an aircraft pedal system comprises the steps of actuating an aircraft pedal by means of a pedal actuation device, sensing an actuation force applied to the aircraft pedal upon actuation of the aircraft pedal and providing a signal indicative of the actuation force by means a force sensor, and sensing an angular deflection of a device deflected in response to the actuation of the aircraft pedal by means of a deflection sensing device. In dependence on whether a brake actuation or a rudder actuation should be tested, the deflection sensing device senses either the deflection of a component of the aircraft brake system or the deflection of a component of the aircraft rudder system. The signals of the force sensor and the deflection sensing device are processed by means of a control unit. The control unit then generates an output indicating the angular deflection of the device deflected in response to the actuation of the aircraft pedal in dependence on the actuation force applied to the aircraft pedal.

The inventive method preferably further comprises the step of driving a force transmitting lever which is connected to a force application rod for applying the actuation force to the aircraft pedal by means of an electric motor, e.g. a linear DC motor which might be connected to the force transmitting lever via a worm gear.

The actuation force applied to the aircraft pedal upon actuation of the aircraft pedal might be sensed by means of a force sensor connected to the force application rod.

If an aircraft brake actuation should be tested, the deflection sensing device preferably senses the angular deflection, i.e. the tilting of the aircraft pedal in response to the actuation of the aircraft pedal. If the aircraft brake system is a brake-by-wire system, the deflection of the aircraft pedal in response to the actuation of the aircraft pedal is an important parameter for the proper operation of the brake system.

If, however, an aircraft rudder actuation should be tested, the deflection sensing device preferably senses the angular deflection of an aircraft rudder in response to the actuation of the aircraft pedal. If the aircraft rudder system is a mechanical cable system, the actual rudder deflection in response to the actuation of the aircraft pedal is an important parameter for the proper operation of the rudder system.

The inventive method might further comprise the step of amplifying signals exchanged between the control unit and the force sensor. Furthermore, the power supply to components of the pedal actuation device might by adjusted.

Signals exchanged between the control unit and a signal amplification and power supply adjusting device might be converted by means of an analogue-digital converter.

Preferably, data acquired during performing a test on an aircraft pedal system is stored in a memory of a data base server connected to the control unit. The risk of loosing data in case of a failure of a memory of the control unit thus can be minimized.

Finally, the inventive method might comprise the steps of comparing an angular deflection value sensed by means of the deflection sensing device at a predetermined actuation force with a nominal angular deflection value at the predetermined actuation force. Furthermore, a warning signal might be output, if a difference between the angular deflection value sensed by means of the deflection sensing device and the nominal angular deflection value at the predetermined actuation force exceeds a predetermined limit.

In particular, a sensed minimal and/or maximal angular deflection value and/or a sensed minimal and/or maximal actuation force and/or a sensed friction value and/or a sensed symmetry value might be compared with respective nominal values. A warning signal might be output, if a difference between a sensed value and a nominal value exceeds a predetermined limit.

During final assembly of an aircraft, the test described in detail above might be performed for a brake pedal application of both pedals of a Captain's pair of pedals and for a brake pedal application of both pedals of a First Officer's pair of pedals. Similarly, the test might be performed for a rudder pedal application of both pedals of a Captain's pair of pedals and for a rudder pedal application of both pedals of a First Officer's pair of pedals.

The present invention now is explained in detail with reference to the schematic drawing showing a preferred embodiment of an inventive apparatus for testing an aircraft pedal system.

An apparatus 10 for testing an aircraft pedal system 12 comprises a pedal actuation device 14 for actuating aircraft pedals 12', 12". The aircraft pedal system 12 shown in FIG. 1 is one of two identical pairs of pedals 12, wherein a first pair of pedals 12 is provided for the Captain and a second pair of pedals 12 is provided for the First Officer of the aircraft in the aircraft cockpit. The right pedal 12" of each pedal pair 12 serves to actuate a right aircraft brake (not shown in the drawing) and to induce a movement of an aircraft rudder 13 to the right. The left pedal 12' of each pedal pair 12 serves to actuate a left aircraft brake (not shown in the drawing) and to induce a movement of the aircraft rudder 13 to the left. To actuate the aircraft brakes, the pedals 12', 12" can be tilted around a tilting axis T, whereas an actuation of the aircraft rudder 13 can be achieved by pushing the pedals 12', 12" forwards, i.e. in a direction towards a front end of the aircraft.

The aircraft brake system is a brake-by-wire system, i.e. signals from pedal sensors (not shown in the drawing) indicating e.g. a pedal actuation force and/or a pedal actuation velocity are processed in an electronic control unit which controls an electromagnetic brake actuation device in dependence on the signals received from the pedal sensors. To the contrary, the aircraft rudder 13 is driven by means of a mechanical cable system (not shown in the drawing) which transmits a pedal actuation force to the rudder 13 so as to induce a pivoting movement of the rudder 13.

The pedal actuation device 14 is provided with a linear electric DC motor 16 which is connected to a force transmitting lever 18 via a worm gear 20. The force transmitting lever 18 is tiltably mounted on a base structure 22, wherein the base structure 22 is adapted to be fixed to a structural component of the aircraft. A force application rod 24 is connected to the tiltable force transmitting lever 18 and serves to apply an actuation force generated by the electric motor 16 to the aircraft pedal 12".

A force sensor 26 is mounted to the force application rod 24 to sense the actuation force applied to the aircraft pedal 12" by the electric motor 16 via the worm gear 20, the force transmitting lever 18 and the force application rod 24. A first potentiometer which serves as a pedal deflection sensing device 28 is mounted to the tiltable force transmitting lever 18 of the pedal actuation device 14. The pedal deflection sensing device 28 thus is adapted to sense the deflection or tilting angle of the force transmitting lever 18 which directly corresponds to the angular deflection of the aircraft pedal 12" upon applying a respective actuation force to the aircraft pedal 12". A second potentiometer which serves as a rudder deflection sensing device 30 is directly attached to the aircraft rudder 13 and thus directly measures the angular deflection of the aircraft rudder 13 upon applying a respective actuation force to the aircraft pedal 12".

The pedal actuation device 14 is connected to a control unit 32 formed by a laptop computer. The control unit 32 is adapted to control the electric motor 16 of the pedal actuation device 14 in accordance with a computer program running in the control unit 32 which causes the control unit 32 to output respective control signals to the electric motor 16 of the pedal actuation device 14. The control signals provided by the control unit 32 are selected based on predefined test requirements defining various test parameters, e.g. a nominal pedal actuation force, a pedal actuation velocity, etc.

The control unit 32 further is adapted to receive and to process signals provided by the force sensor 26, the pedal deflection sensing device 28 and the rudder deflection sensing device 30. The signals exchanged between the control unit 32 and the force sensor 26 are amplified by means of a signal amplification and power supply adjusting device 34. The signal amplification and power supply adjusting device 34 further serves to adjust the power supply to the electric motor 16, the force sensor 26 and the pedal deflection sensing device 28. An analogue-digital converter 36 is provided for converting signals exchanged between the control unit 32 and the signal amplification and power supply adjusting device 34.

The control unit 32 comprises a display unit 38 and is connected to a printer (not shown in the drawing). Furthermore, the control unit 32 is connected to a data base server 40, so that data acquired by the control unit 32 during performing an aircraft pedal system test can be stored in a memory of the date base server 40.

For performing an aircraft brake pedal or an aircraft rudder pedal test the base structure 22 of the pedal actuation device 14 is fastened to a floor panel disposed in the aircraft cockpit. Thereafter, the force application rod 24 is attached to the aircraft pedal 12" by means of a suitable clamping device. The force application point on the pedal 12", i.e. the attachment point of the force application rod 24 to the pedal 12" is selected in dependence on whether the aircraft brake system or the aircraft rudder system should be tested. If the aircraft brake system should be tested, the force application point on the pedal 12" is selected so as to ensure that an operation of the pedal actuation device 14 causes a tilting of the pedal 12" around the tilting axis T. To the contrary, if the rudder brake system should be tested, the force application point on the pedal 12" is selected so as to ensure that an operation of the pedal actuation device 14 causes a translatory movement of the pedal 12" in the direction of a front end of the aircraft.

To actuate the aircraft pedal 12", the electric motor 16 of the pedal actuation device 14 is operated so as to shorten a length of the worm gear 20 and thus cause a tilting movement of the force transmitting lever 18 in a forward direction, i.e. in a direction towards the aircraft pedal 12". Due to the tilting movement of the force transmitting lever 18 the driving force of the electric motor 16 is transmitted to the force application rod 24 and hence the aircraft pedal 12". The operation of the electric motor 16 is controlled by means of the control unit 32 in accordance with the predefined test parameters forming the basis of the computer program running in the control unit 32.

Upon actuation of the aircraft pedal 12", the actuation force applied to the pedal 12" by the electric motor 16 via the worm gear 20, the force transmitting lever 18 and the force application rod 24 is sensed by means of the force sensor 26. The force sensor 26 provides signals indicative of the actuation force applied to the pedal 12" to the control unit 32, wherein the signals transmitted from the force sensor 26 to the control unit 32 are amplified by means of the signal amplification and power supply adjusting device 34.

In case an aircraft brake pedal test is performed, the control unit 32 further receives signals from the pedal deflection sensing device 28 which are indicative of the deflection or tilting angle of the force transmitting lever 18 and hence the angular deflection of the aircraft pedal 12" upon applying an actuation force to the aircraft pedal 12". If, however, an aircraft rudder pedal test is performed, the control unit 32 receives signals from the rudder deflection sensing device 30 which are indicative of the angular deflection of the aircraft rudder 13 upon applying an actuation force to the aircraft pedal 12".

The control unit 32 processes the signals provided by the force sensor 26 as well as the pedal deflection sensing device 28 and the rudder deflection sensing device 30, respectively, and generates an output indicating the angular deflection of the aircraft pedal 12" and the rudder 13, respectively, in dependence on the actuation force applied to the aircraft pedal 12". As becomes apparent from the drawing, the relationship between the actuation force applied to the aircraft pedal 12" and the angular deflection of the aircraft pedal 12" and the rudder 13, respectively, is output by the control unit 32 in the form of a diagram showing a plot of the angular deflection of the aircraft pedal 12" and the rudder 13, respectively, in dependence on the actuation force applied to the aircraft pedal 12". The diagram is displayed on the display unit 38 of the control unit 32 and printed by means of the printer connected to and controlled by the control unit 32.

The control unit 32 further compares sensed minimal and maximal angular deflection values, sensed minimal and maximal actuation force values, sensed friction values and sensed symmetry values with respective nominal values. The control unit 32 outputs a warning signal in the form of a coloured message on the display unit 38 of the control unit 32, if a difference between a sensed value and a nominal value exceeds a predetermined limit.

The data acquired by the control unit 32 during performing the test and the results of the above comparison between the angular deflection values of the aircraft pedal 12" and the rudder 13, respectively, at two predetermined actuation force values and respective nominal angular deflection values at the two predetermined actuation force values finally are stored in the memory of the data base server 40.

The invention claimed is:

1. Apparatus for testing an aircraft pedal system, which comprises:
   a pedal actuation device for actuating an aircraft pedal,
   a force sensor for sensing an actuation force applied to the aircraft pedal upon actuation of the aircraft pedal and for providing a signal indicative of the actuation force,
   a first deflection sensing device for sensing an angular deflection of a component of an aircraft brake system which is deflected in response to the actuation of the aircraft pedal,
   a second deflection sensing device for sensing an angular deflection of a component of an aircraft rudder system which is deflected in response to the actuation of the aircraft pedal, and
   a control unit adapted to process the signals of the force sensor and the deflection sensing devices so as to generate an output indicating the angular deflection of the components of the aircraft brake system and the aircraft rudder system which are deflected in response to the actuation of the aircraft pedal in dependence on the actuation force applied to the aircraft pedal.

2. Apparatus according to claim 1, wherein the pedal actuation device comprises an electric motor for driving a force transmitting lever which is connected to a force application rod for applying the actuation force to the aircraft pedal.

3. Apparatus according to claim 2, wherein the force sensor for sensing the actuation force applied to the aircraft pedal upon actuation of the aircraft pedal is connected to the force application rod.

4. Apparatus according to claim 1, wherein the first deflection sensing device is a device for sensing the angular deflection of the aircraft pedal in response to the actuation of the aircraft pedal, and wherein the second deflection sensing device is a device for sensing the angular deflection of an aircraft rudder in response to the actuation of the aircraft pedal.

5. Apparatus according to claim 1, further comprising a signal amplification and power supply adjusting device which is adapted to amplify signals exchanged between the control unit and the force sensor and to adjust the power supply to components of the pedal actuation device.

6. Apparatus according to claim 5, further comprising an analogue-digital converter for converting signals exchanged between the control unit and the signal amplification and power supply adjusting device.

7. Apparatus according to claim 1, wherein the control unit is connected to a data base server.

8. Apparatus according to claim 1, wherein the control unit is adapted to compare a sensed value with respective nominal values and to output a warning signal, if a difference between a sensed value and a nominal value exceeds a predetermined limit.

9. Apparatus according to claim 8, wherein the sensed value is selected from the group consisting of a sensed minimal angular deflection value, a sensed maximal angular deflection value, a sensed minimal actuation force, a sensed maximal actuation force, a sensed friction value, a sensed symmetry value, and combinations thereof.

10. Method for testing an aircraft pedal system, which comprises the steps of:
    actuating an aircraft pedal by means of a pedal actuation device,
    sensing an actuation force applied to the aircraft pedal upon actuation of the aircraft pedal and providing a signal indicative of the actuation force by means a force sensor,
    sensing an angular deflection of a component of an aircraft brake system which is deflected in response to the actuation of the aircraft pedal by means of a first deflection sensing device,
    sensing an angular deflection of a component of an aircraft rudder system which is deflected in response to the actuation of the aircraft pedal by means of a second deflection sensing device, and
    processing the signals of the force sensor and the deflection sensing device by means of a control unit so as to generate an output indicating the angular deflection of the components of the aircraft brake system and the aircraft rudder system which are deflected in response to the actuation of the aircraft pedal in dependence on the actuation force applied to the aircraft pedal.

11. Method according to claim 10, further comprising the step of driving a force transmitting lever which is connected to a force application rod for applying the actuation force to the aircraft pedal by means of an electric motor.

12. Method according to claim 11, further comprising the step of sensing the actuation force applied to the aircraft pedal upon actuation of the aircraft pedal by means of a force sensor connected to the force application rod.

13. Method according to claim 10, wherein the first deflection sensing device senses the angular deflection of the aircraft pedal in response to the actuation of the aircraft pedal, and wherein the second deflection sensing device senses the angular deflection of an aircraft rudder in response to the actuation of the aircraft pedal.

14. Method according to claim 10, further comprising the steps of:
    amplifying signals exchanged between the control unit and the force sensor, and/or
    adjusting the power supply to components of the pedal actuation device.

15. Method according to claim 14, further comprising the step of converting signals exchanged between the control unit and a signal amplification and power supply adjusting device by means of an analogue-digital converter.

16. Method according to claim 10, further comprising the step of storing data acquired during performing a test on an aircraft pedal system in a memory of a data base server connected to the control unit.

17. Method according to claim 10, further comprising the steps of:
    comparing a sensed value with respective nominal values, and
    outputting a warning signal, if a difference between a sensed value and a nominal value exceeds a predetermined limit.

18. Method according to claim 17, wherein the sensed value is selected from the group consisting of a sensed minimal angular deflection value, a sensed maximal angular deflection value, a sensed minimal actuation force, a sensed maximal actuation force, a sensed friction value, a sensed symmetry value, and combinations thereof.

* * * * *